United States Patent [19]

Mero et al.

[11] Patent Number: 5,954,332
[45] Date of Patent: Sep. 21, 1999

[54] ROLE PLAYING GAME

[76] Inventors: George T. Mero, 142 Main St., P.O. Box 76, Schaghticoke, N.Y. 12154; Michael J. Mero, 3 Louise Dr., Latham, N.Y. 12110

[21] Appl. No.: 09/016,027

[22] Filed: Jan. 30, 1998

Related U.S. Application Data

[62] Division of application No. 08/646,501, May 8, 1996, Pat. No. 5,810,666.

[51] Int. Cl.[6] .............................. A63F 9/22; A63F 1/00; H04K 1/00
[52] U.S. Cl. ...................... 273/236; 273/138.2; 463/16; 463/42
[58] Field of Search .................................. 273/292, 293, 273/308; 463/1, 16–18, 30, 40–42

[56] References Cited

U.S. PATENT DOCUMENTS

| | | |
|---|---|---|
| 1,243,263 | 10/1917 | Cohen . |
| 1,631,009 | 5/1927 | Clark . |
| 3,734,510 | 5/1973 | Breslow . |
| 4,373,726 | 2/1983 | Churchill et al. . |
| 4,521,014 | 6/1985 | Sitrick . |
| 4,791,376 | 12/1988 | Goldman et al. . |
| 4,832,341 | 5/1989 | Muller et al. . |
| 4,922,522 | 5/1990 | Scanlon . |
| 5,051,822 | 9/1991 | Rhoades . |
| 5,082,275 | 1/1992 | Nilssen . |
| 5,112,059 | 5/1992 | Mindle et al. . |
| 5,186,463 | 2/1993 | Marin et al. . |
| 5,213,334 | 5/1993 | Yih . |
| 5,297,802 | 3/1994 | Pocock et al. . |
| 5,324,035 | 6/1994 | Morris et al. . |
| 5,351,970 | 10/1994 | Fioretti . |
| 5,533,124 | 7/1996 | Smith et al. . |
| 5,538,255 | 7/1996 | Barker . |
| 5,558,339 | 9/1996 | Perlman . |
| 5,662,332 | 9/1997 | Garfield ................................. 273/308 |
| 5,689,561 | 11/1997 | Pace .......................................... 463/29 |

OTHER PUBLICATIONS

Sports Cards, Aug. 1993, pp. 8–9, 30, 32, 34, 36, 38, 40–42, 44, 46, 48, 57–59, 64–65, 90, 92–95, 103 and cover.
Trading Cards, Sep. 1993, cover plus pp. 52–53.
Titan rulebook, by McAllister and Trampier, copyright 1980, pp. 1–12, plus Strike Chart, Battleboard and playing pieces page.
Magic Realm Rules, by Avalon Hill Game Company, copyright 1986, pp. 1–3, 44–45 and 79.

*Primary Examiner*—Jessica J. Harrison
*Assistant Examiner*—Mark A. Sager
*Attorney, Agent, or Firm*—Schmeiser, Olsen & Watts

[57] ABSTRACT

Disclosed herein is a role playing game for 2–6 players. The game is broken down into a series of class games to decide a plurality of class winners, each of said games utilizing a different game board and game pieces. The class winners, once determined, unite to play against an ultimate final opponent, Malreath. Game play includes game cards which are directly affected by the resulting roll of a pair of dice. In addition, every game card sold is individual numbered, certain of the cards being more or less rare than the others.

14 Claims, 7 Drawing Sheets

ROLE PLAYING GAME

This application is a divisional of application Ser. No. 08/646,501, filed on May 8, 1996, now U.S. Pat. No. 5,810,661. The entire disclosure of that prior application is considered as being part of the disclosure of this application and is hereby incorporated by reference herein.

The present invention relates generally to games. In particular, the present invention is concerned with a role playing game involving trading cards that can be played by a plurality of players.

BACKGROUND OF THE INVENTION

Presently there are a variety of games that involve role playing and fantasy where players attempt to eliminate each other. In all of these games, the ultimate strategy is to eliminate all of your opponents. Various types of strategies and media are involved to provide a means for elimination. Many of these such games include playing cards as the primary medium. For instance, U.S. Pat. No. 1,243,263 to Cowen discloses a card game based upon creation in which various cards disclose creatures, each of which has a predetermined value.

U.S. Pat. No. 5,112,059 to Mondale et al. discloses a card game in which military items are placed on each card. Again, each of the cards has a predetermined value. Finally, U.S. Pat. No. 5,213,334 to Yih discloses yet another card game, this one involving a hierarchal ranking of members of a typical society, each of said cards having a predetermined value.

Until now, no game has existed in which a roll of a dice corresponds to the value or utility of the game card involved. Moreover, no game in the past has utilized these role playing notions to find a team of winners to fight against a single opponent. Additionally, no game exists that utilizes individually numbered cards to allow for tracking of a player's cards for on-line play. The present invention seeks to provide such functionality.

SUMMARY OF THE INVENTION

Briefly, the present invention is a role playing dual board game for a plurality of players in which a series of class games are played to determine class winners, then a final game is played in which the class winners unite to battle against a final opponent. The present invention comprises a random number generating device such as dice, and a plurality of game cards. Each of the game cards comprises a plurality of numeric ranges such that the roll of the dice can dictate the relative utility of that individual playing card. In addition, the invention comprises a plurality of class game boards and a single final game board, each of said boards having a first and second side. Each of the class game boards is used to determine a class winner while the final game board is used by the class winners to unite in a final battle against the final opponent. In accordance with the above, it is an object of the present invention to provide a role playing game in which class winners unite to play against a final opponent.

In accordance with the above, it is a further object of the present invention to provide a role playing game that utilizes game cards whose utility is dictated by a roll of the dice.

In accordance with the above, it is a further object of the present invention to provide a series of class games, each of which provides a different means of elimination than the others.

In accordance with the above, is a further object of the present invention to provide a plurality of game boards with a second side for determining class winners among two remaining players.

Still a further object is to provide a game with collectable game cards.

Still a further object of the present invention is to provide collectable game cards that are individually numbered to make each card unique.

Still a further object of the present invention utilizes the individual number of each game card to access that particular card's ability during Internet or other on-line play.

BRIEF DESCRIPTION OF THE DRAWINGS

These and other advantages of the present invention become more readily apparent upon reading the following detailed description and upon reference to the drawings to which.

DETAILED DESCRIPTION OF THE PREFERRED EMBODIMENTS

Figure 1:
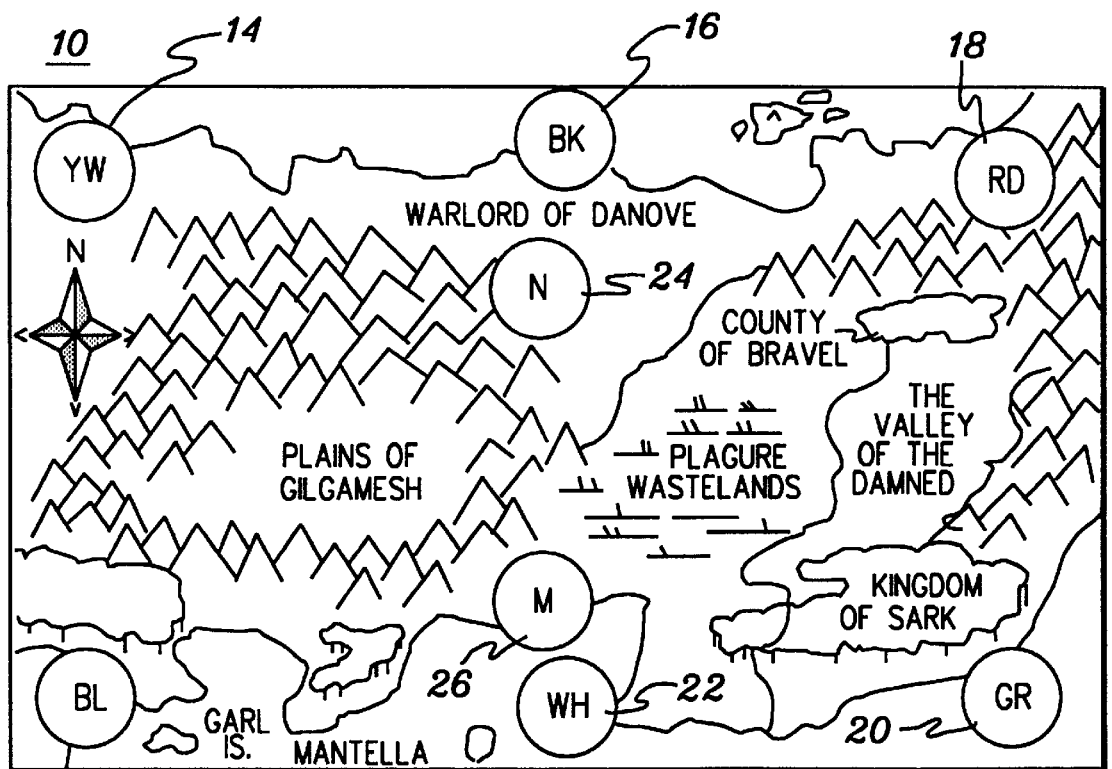
FIG. 1 depicts the top of the first game board entitled "Wars of Elimination" board.
Figure 2:
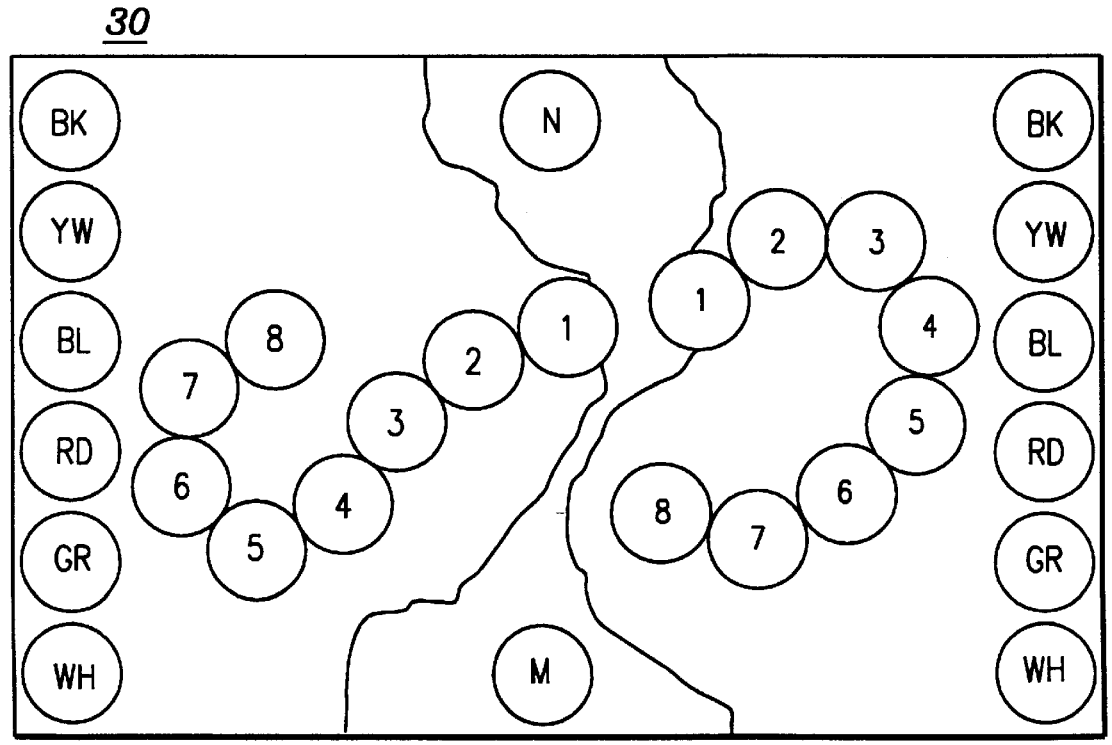
FIG. 2 depicts the bottom of the first game board entitled "Twin Spires" board.

Referring now to the drawings and more particularly FIGS. 1 and 2, there is shown a game board for use in the first round of determining a class winner. The board comprises a first side 10 shown in FIG. 1 and second side 30 shown in FIG. 2. The first side of the board 10 is utilized to eliminate players such that there are only two remaining. The second side 30 is utilized to determine the class winner as between the two players which remained from play on the first side of the board 10. Once a class winner is determined, then play continues by playing a similar series of games on the second, third, fourth and fifth game boards in a manner similar to that discussed herein. At that point there will be five class winners who will then face Malreath, the final opponent, and a final battle on game board six (See FIGS. 11 and 12). For the purposes of the description of how the game works, focus will be drawn closely to the first two sided game board as shown in FIGS. 1 and 2. Rule changes for the remaining boards will then be discussed. Referring to FIG. 1, there are eight positions for placement of game cards, 12, 14, 16, 18, 20, 22, 24 and 26. Position 24 contains Neutral Resource cards, position 12 contains blue Aura Arsenal deck cards, position 14 holds the yellow Aura Arsenal deck cards, position 16 holds the black Aura Arsenal deck cards, position 18 holds the red Aura Arsenal deck cards, position 20 holds the green Aura Arsenal deck cards, position 22 holds the white Aura Arsenal deck cards and position 26 holds the discarded Neutral Resource deck cards.

Play on this board, generally referred to as "The Wars of Elimination," comprises the following rules. Each player, or cleric, starts with 25 health points. A die is rolled by each player to determine who is the first player to take the first turn. The first player shuffles the Neutral Resource deck and every other player cuts the Neutral Resource deck going left. The first player draws the top card from the resource deck and every other player does the same until all players have three cards. These are the cards you start the game with. The goal of the game is to attack the other players utilizing your cards and eliminate the health points of the other players.

As alluded to above, there are seven individual decks of cards, the Neutral Resource deck and six colored Aura Arsenal decks. Each of the Aura Arsenal decks can be accessed by an overlord, or "ruler" card. The overlord or ruler cards are contained in the Neutral Resource deck. These cards are needed to control the individual Aura Arsenals. Thus, you can only utilize cards from the various Aura Arsenal decks if you happen to have the overlord or ruler card on the board.

Proceeding with game play, there is a declaration phase. Starting with the first player, and then proceeding left, each player is given the option of playing any or all overlords that they possess. This is the only time a player may put more than one card into play during one turn unless a card states differently. As cards are drawn from turn to turn, players are only allowed to have five cards maximum in their hand at any one time. If any player has more cards, the extra Neutral Resource cards must be put onto position 26, also known as the mausoleum. Any Aura card discarded goes into the spent position (i.e., face up at the bottom) of the Aura Arsenal Deck from which it came.

The first player draws a card and may choose to put a card into play. If the player has access to one or more Aura Arsenals, they must choose from which pile to pick their card. In other words, if a player has a yellow overlord (or ruler card), they may either draw from the yellow Aura Arsenal deck 14 or the Neutral Resource deck 24. Different cards within each deck provide the player with different powers, capabilities or utilities. These cards will be discussed in more detail later.

A player attacks by stating the player he is attacking and the card that will be used. Each card has a range of possible outcomes based on the roll of the dice. Therefore, the attacking player must roll the dice to determine if their attack is successful. If the attack is successful the target player gets a chance to defend if they choose and/or are able. If an attack is not successful no defense is necessary. One defense chance is given for each attack. When a card is used to attack or defend it is flipped over unless stated otherwise on the card. A flipped card can not defend or attack again until the player's next turn. A player begins each turn by unflipping any flipped cards they have in play. Certain cards, such as spells, can only be used once and are immediately discarded to the mausoleum (if a Neutral Resource card) or put into the spent position (if an aura card).

Other cards such as multiple armies, creatures, characters and royalties must be kept in marching orders by colors. Any attack in that direction must be at the card in the front of a marching order, unless specifically stated otherwise on the attacking card. Attacks by flying things can be directed directly at the player or any specific character, creature or army of the attacker's choice.

When an overlord (or ruler card) is converted or diverted he goes alone. Any aura card he allowed into play goes back to the arsenal deck from which it came. If an overlord is killed he goes to the mausoleum and all Aura cards he allowed into play go to the spent position of the aura deck from which it came.

The Neutral Resource deck comprises the following cards. There are one of each of the following royalty cards for each aura of power: the overlord card which is needed to control the Aura Arsenal; a soulmate card which grants the overlord bonuses and may be held for ransom; and a sergeant at arms card which grants bonuses to armies of his aura, and acts as bodyguard of the controlling player (cleric), or may be used as a traitor.

There are six of each of the following neutral cards that can be used by any player. Creature and army cards have abilities which are described on the card text. Sanctuary cards which restore up to five health points to any player or the target of a certain aura. Offensive spells may cause damage or give bonuses to the target. Defensive spells may prevent damage or assign negatives to a target. Artifacts are ancient power items that work per card text until all charges are used. Void cards cancel the effect of a card in play of a certain aura. Reverse cards reverse the damage done to a target and force it upon its original source. Diversion cards send damage directed at a target to any other source, except the intended recipient or its original source. Convert overlord cards bring an overlord of a specific aura directly under the players control. Divert overlord cards take control of a specific aura's overlord and assign it to any other player except himself and the original controller. Conjunction cards enable two stated aura colors the ability to work together. Spies allow the user to see the top three cards of a particular Aura Arsenal deck. Glyphs are power symbol cards that are used to prevent damage from all stated auras attacks. Assassins deal damage directly at a target player if successful.

Each Aura Arsenal deck will contain a certain number of the following types of cards and each card will operate according to its text and type. Spell cards are immediately used as per card text. Artifact cards are immediately available as per card text when assigned to an unflipped character, creature or army. Creatures, armies and characters, each have health points and individual abilities as per card text. Weapons, artifacts, and other items each must be assigned to an unflipped card and used as per card text. Event cards are cards which are played to immediately force a certain turn of events as per card text.

It is also important to know that card colors which are in direct opposition of each other will never work in conjunction with each other. For instance, red and blue, yellow and green, and black and white will act in certain ways as per card text and will never work in conjunction with each other.

Once all of the players except for two have been eliminated on the first side of the "Wars of Elimination" board, the board is flipped over and the two remaining players attempt to eliminate each other.

During this elimination phase, any card in a participant's hand from side one remains. The name given for this round, as shown in FIG. 2, is the "Twin Spires Board" round 30.

Rules for the "Twin Spires Board" are as follows. Any overlord under a participant's control goes with him to the "Twin Spires." Any other resource or Aura Arsenal cards get reshuffled into the proper deck. Unless a marriage or coronation card is in play, the other royalty cards get reshuffled into the resource deck. Each player rolls one die to see who will be the first player. The first player then chooses a card from his hand or the neutral resource deck, or any aura deck available to him, and places it face down in the eighth level 34 of his spire. If a spire card is taken from the Neutral Resource deck, the player must place it face down without looking at it. The second player then does the same. This continues until all levels have been filled with one card face down. The first player then starts his turn by drawing a card available to him and continuing play as normal. All attacks must be directed at the lowest guarded level of the spire being attacked, unless it is from a spell or flying source that allows an attack to a player directly. All other rules from the wars of elimination apply. The last player cleric alive is the winner and takes any prizes and glory due such a worthy accomplishment. The class winner then becomes a member of the Rainbow Party.

Any rule not covered, or any rule you want to modify, must be put to a vote by any remaining players. Majority always rules. In the event of a tie vote the player that called the vote rolls both dice to determine which way it will be decided.

Figure 3:
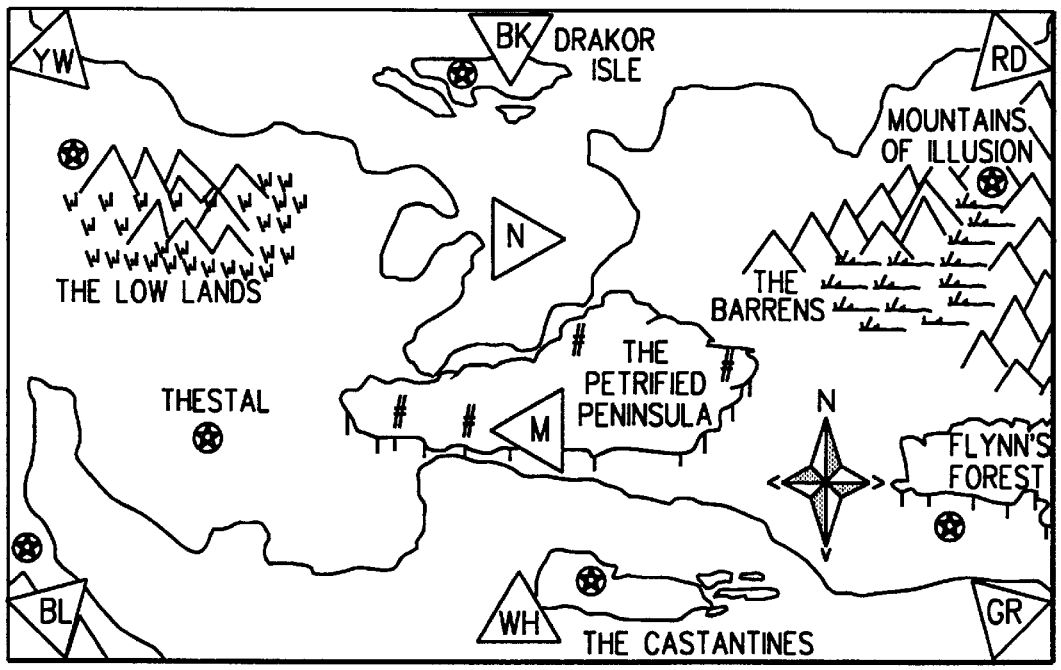
FIG. 3 depicts the top of the second board entitled "Cut Throat" for the second game entitled "Thieves Of Thestal"
Figure 4:
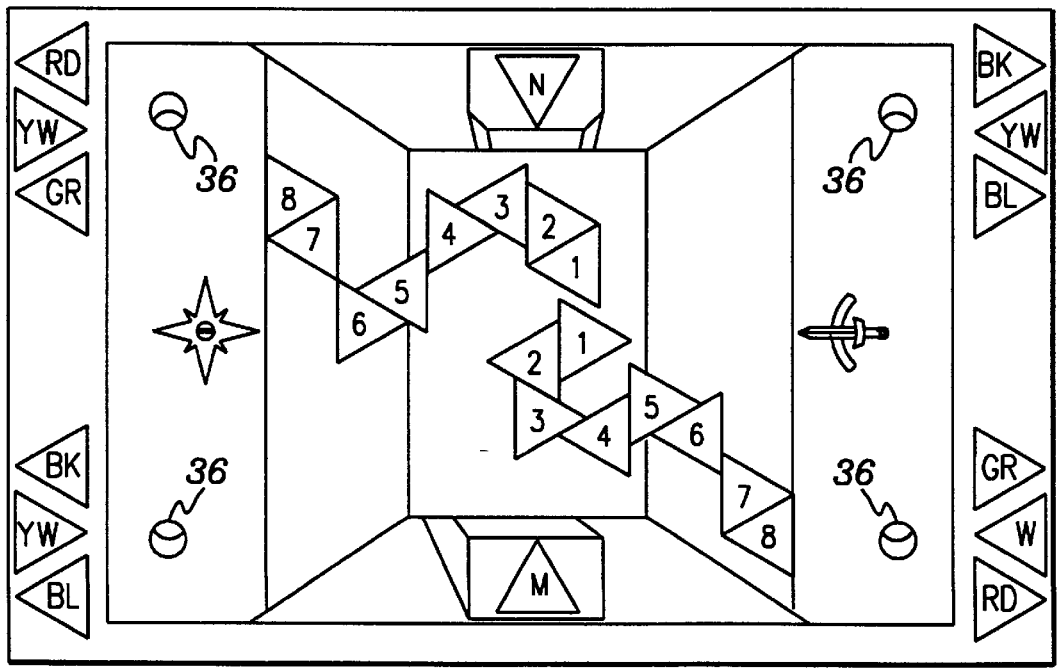
FIG. 4 depicts the bottom of the second board entitled "The Platform of Blood Letting"

The process of elimination and determining a class winner is then repeated on the successive game boards. Referring to FIGS. 3 and 4, the second game board is labeled the "Thieves of Thestal", with "The Wars Of Elimination", or first side of the board, referred to as "Cut Throat" 32 and the second side referred to as the "Platform Of Blood Letting" 34. The rules of play of the second board are exactly the same as the first board with the exception of play on the second side which incorporates the following distinctions.

All equipment brought into play must first be placed on one of the two offering plates 36 for one turn before being assigned to any unflipped character or creature. All other rules are essentially the same.

Figure 5:
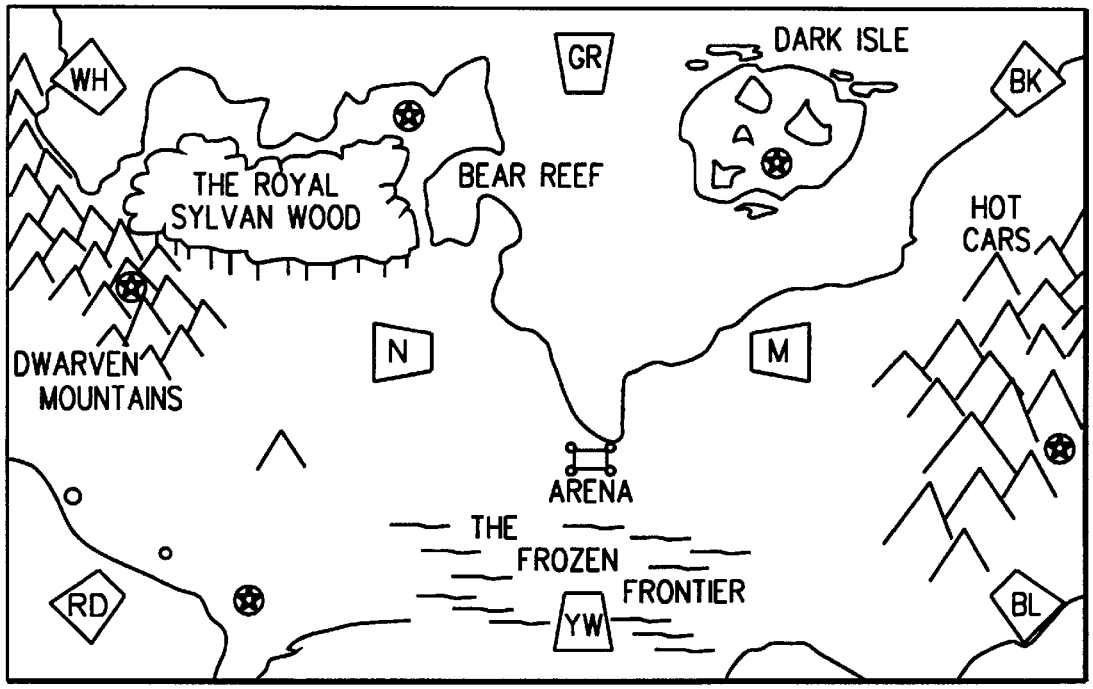
FIG. 5 depicts the top of the third board entitled "Knights of Neehrow"
Figure 6:
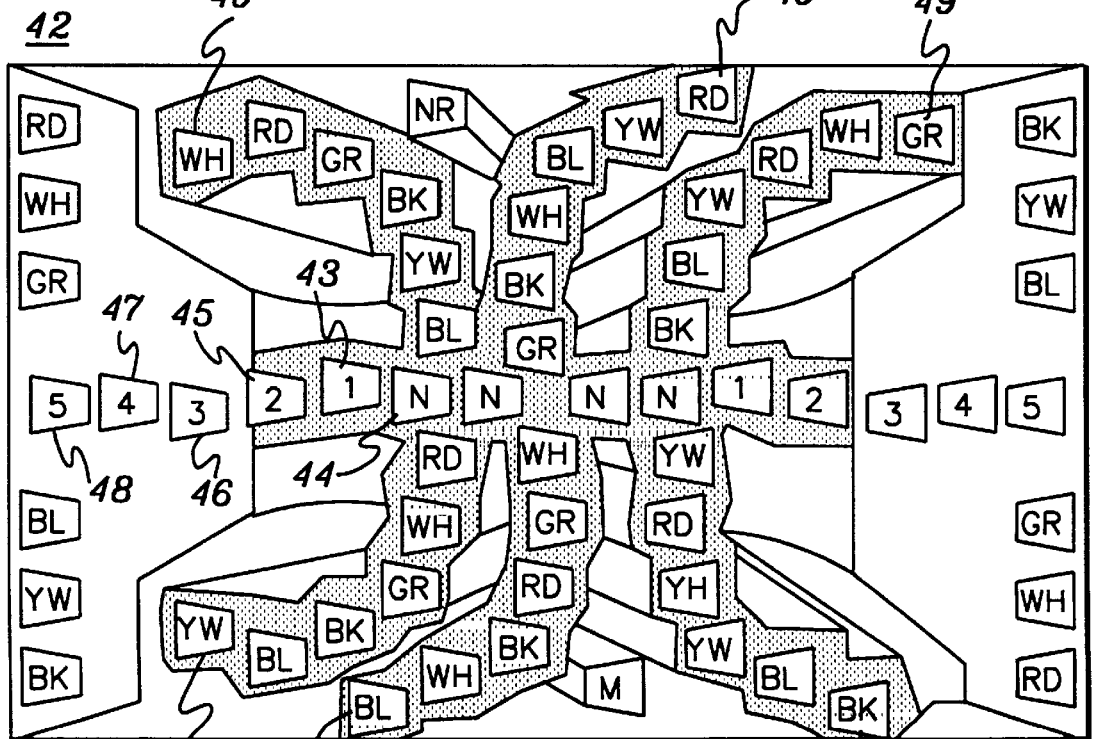
FIG. 6 depicts the second side of the third board entitled "The Arena"

Referring now to FIGS. 5 and 6, the third game board shown is entitled "The Knights of Neehrow". The first side of the board (or wars of elimination round) is referred to as "Blood Bath" 40 and the second side of the board is referred to as "The Arena" 42.

The rules of play on the second board incorporate the following distinctions. A first player draws a card available to them and advances all cards one position. The card in the first position 43 of their formation moves into the neutral position 44 in the center of the arena. The card in the second position 45 moves into the first position 43, third to second, fourth to third, and fifth to fourth. This leaves the fifth position 48 vacant. Each subsequent turn a player may place one card into the fifth position 48. A card may only be played in the fifth position 48 if that position is vacant. Each creature and character is trying to advance to the final place aura's hall 49. When occupying a place of an opposing auras color, that creature or character gets minus two health points and minus two on any damage. When occupying a place of their own aura's color, the character or creature gains two health points and two on any damage. Once a character or creature reaches the final place of their aura's hall in the arena, it can attack an opponent and no defense is given for a successful attack. In addition, a character or creature may also attack any opposing character or creature that occupies a place in the arena that they would be able to advance to if it were not occupied. Finally, any character or creature brought into play must be placed in the fifth battle formation position.

Figure 7:
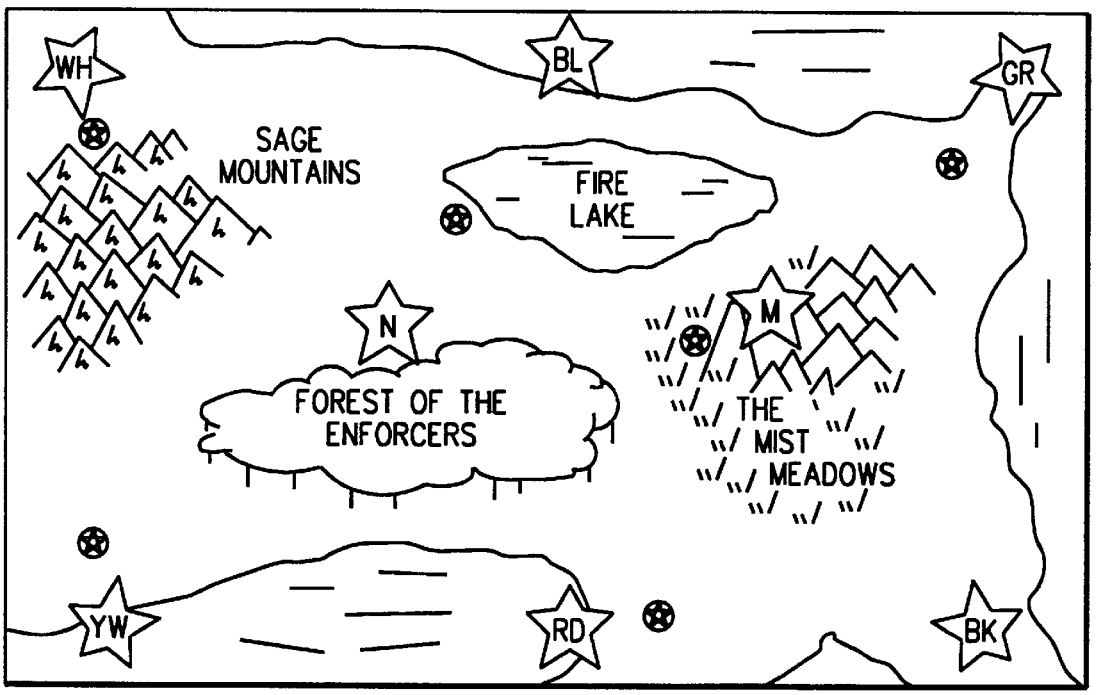
FIG. 7 depicts the first side of the fourth board entitled the "Channelling" for the fourth game "Mages of Myresty"
Figure 8:
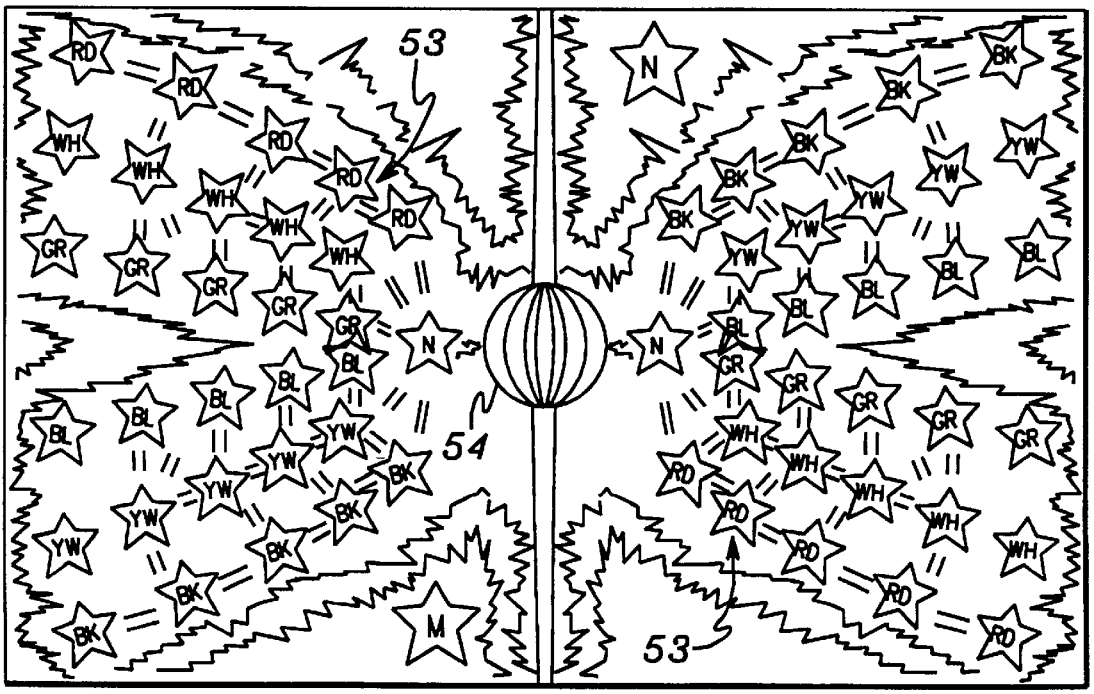
FIG. 8 depicts the second side of the fourth board entitled "The Dimensional Web"

Referring now to FIGS. 7 and 8, the fourth game board is shown and is referred to as the "Mages Of Myresty" with the first wars of elimination board referred to as the "Channeling" 50 and the second side of the board referred to as the "Dimensional Web" 52. Again, play is exactly the same as with that of the first board with the exception that the second side 52 of the fourth board as shown in FIG. 8 utilizes the following rule changes.

In the web 53, the player may fill up to six spaces of their web that correspond with the aura color of the character or creature they wish to occupy that space. A first player draws a card available to them and advances all cards one position. Each subsequent turn a player may place a character or creature in the web. Each character or creature that advances to the neutral space of their side of the web is placed into the void for the following turn. On that player's next turn, it is put into play on the neutral space on the opponent's side of the web. If a neutral space on the web is occupied by the opponent's character or creature, the card must battle. The void 54 can hold more than one card, no other space can be occupied by more than one character or creature at anyone time. Any equipment brought into the void 54 remains with the assigned character or creature until it comes out of the void. Equipment in the void 54 can not be reassigned during the controlling player's regroup phase. Each card on an opponent's side of the web 53 can attack adjacent occupied spaces. When a character or creature reaches the final space of the web in front of the opponent it can attack the opposing players directly. Any successful attack from this position does not get a defense.

Figure 9:
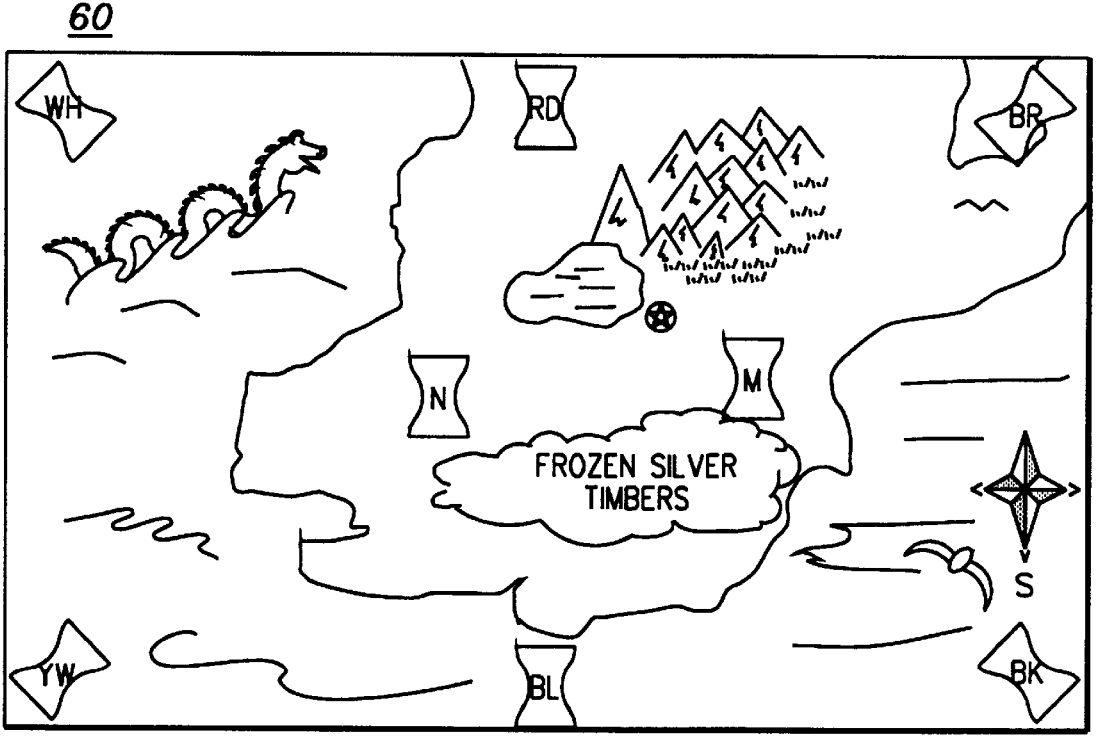
FIG. 9 depicts the first side of the fifth board entitled "Awakening" for the fifth game entitled "Geminis of Jescuitin"
Figure 10:
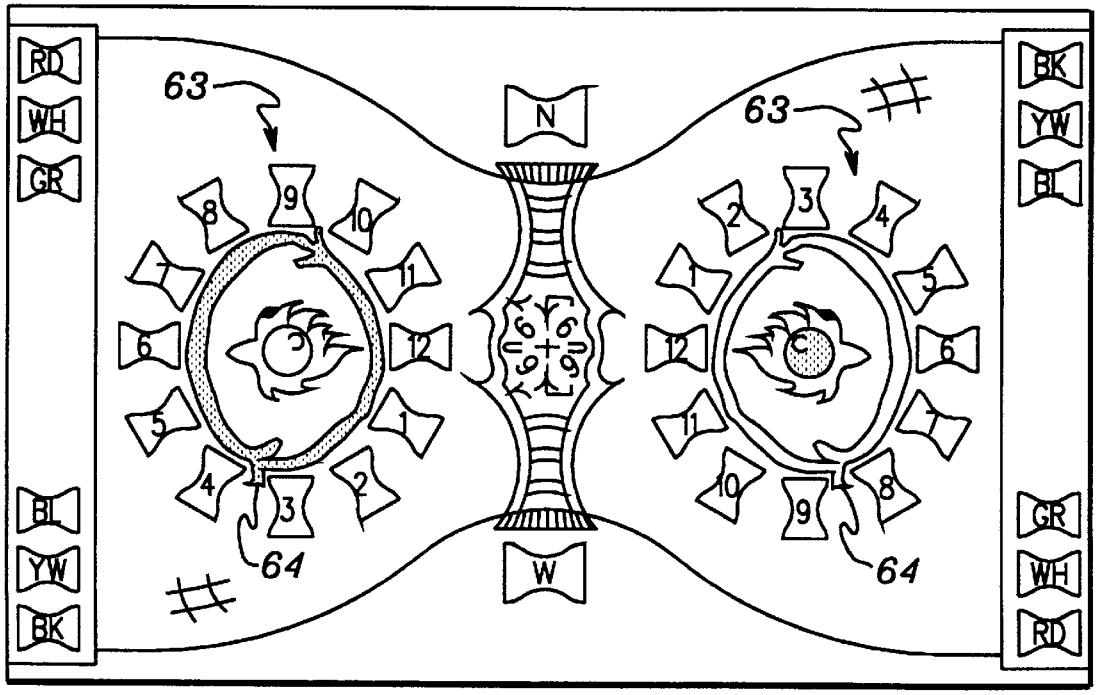
FIG. 10 depicts the second side of the fifth board entitled "Time Trials"

Referring now to FIGS. 9 and 10, the fifth game board is shown referred to as "Geminis of Jescuitin". The first side of the board (or Wars of Elimination), is referred to as "The Awakening" 60 and the second side of the board is referred to as "Time Trial" 62. Once again, play for these two boards is similar to that of the first game board with the exception that the second side 62 of the game board incorporates the following rule distinctions.

In this game players initially set their clocks 63 from 1:00 to 12:00 by placing cards thereon. After each turn all cards remaining in a player's clock 63 must move one clock position in the direction of their clock's inner arrow 64. All attacks must be directed at the corresponding clock position of the opponent. The character or creature in the 12:00 o'clock position can only attack a character or creature in the opponent's 12:00 o'clock position. All carry over damage is assigned in the direction of the opponent's inner arrow. Carry over damage that would go to a clock position that is vacant is not assigned to an opposing player. When the corresponding clock position is vacant, the attacking character or creature can attack the opposing player directly. Any successful attack on a player because their corresponding clock position is vacant does not allow a defense. After the second player's twelfth turn, the two players switch places and attack each other with their opponent's clock against their former clock. Players must switch sides every twelve turns. Only players trade positions. All cards in their hand in play remain where they are and all decks in play remain where they are. Each player retains their own remaining health points.

Figure 11:
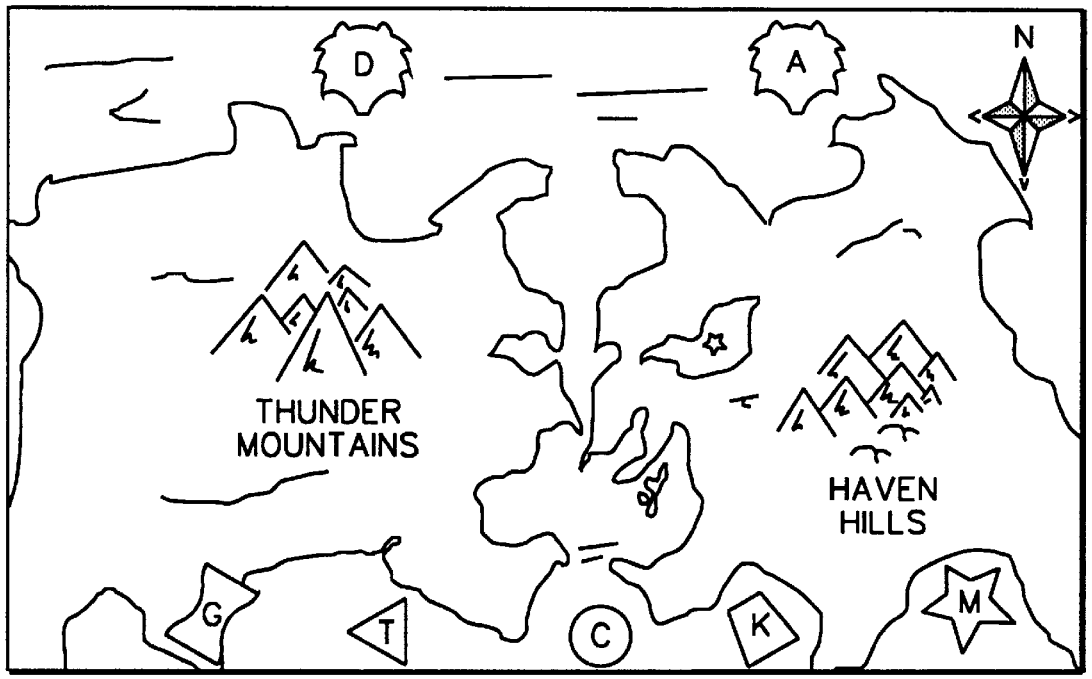
FIG. 11 depicts the first side of the final board entitled "Descent To The Top"
Figure 12:
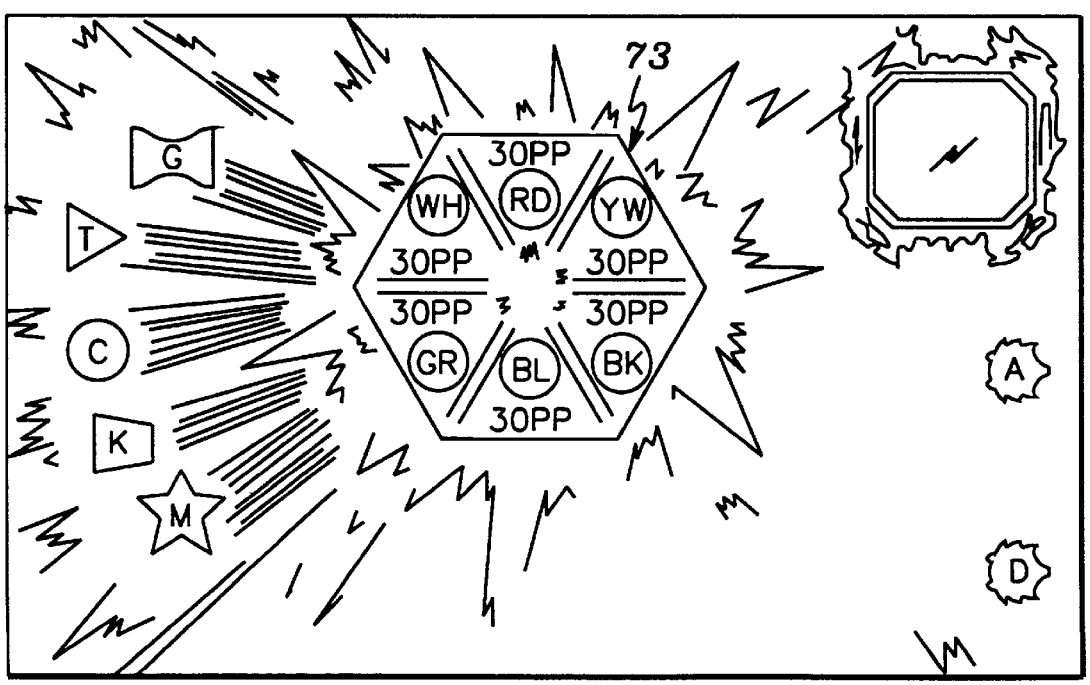
FIG. 12 depicts the second side to the final board entitled "The Final Beginning"

Referring now to 11 and 12, the final game board is shown entitled "Malreath, The Final Beginning". FIG. 11 depicts the first side 70 of the game board referred to as "Descent To The Top" and FIG. 12 depicts the second side 72 of the game board deemed "Malreath, The Final Beginning". Play on this game board pits the first five class winners (the Rainbow Party) against Malreath, the final opponent. If one player was a class winner in more than one class, i.e. a "multiple winner," the multiple winner may select another player and designate them as a class winner for whichever class the double winner chooses. Generally speaking, if there are six players who have participated in the game, the one player who was not a class winner or was not selected as a class winner by another participant who won more than one class game will then take the role as Malreath and play against the five class winners. Rules for this engagement are as follows.

Each rainbow party member begins the game with twenty five health points. The demon player begins with a hundred health points. Each rainbow party member shuffles the rainbow deck that they will be using. The demon player must shuffle the deck that will be in play. Each rainbow deck may include from twenty to one hundred cards of any color. The demon deck may range from one hundred to two hundred demon cards. Each rainbow party member draws three cards from their rainbow deck while the demon player draws six from the demon deck, these are the cards each player has to begin the game. Rainbow party members may hold up to five cards in their hands at one time. The demon player can only hold a maximum of six cards in his hand at anyone time. The rainbow party begins their turn by each member drawing one card, playing one card and starting any attacks. After all successful attacks are given a defense chance, all damage is assigned and the demon player starts his turn. Rainbow party members must form their marching order by aura colors. The demon player begins each turn by drawing three cards and playing three cards and stating any attacks. After each successful attack is given a defense chance, all damage is assigned. If the demon player puts all six pieces of the large mirror in play the dual board is flipped over to expose the Rainbow Prism of Kolouria 73. Each portion of the rainbow prism has thirty power points. If the demon player destroys a portion of the rainbow prism, all cards of that aura color are removed from the game and placed in the spent position of the rainbow deck of which it came. No other card of that aura color may be played unless the destroyed portion of the rainbow prism has been restored to at least one power point. If the rainbow prism has been exposed, the demon may choose to attack the rainbow prism or the rainbow party member or any marching order. If the rainbow party removes or destroys a portion of the large mirror after the prism has been exposed, the demon player may not attack the prism until the mirror portion is replaced and restored. If the demon player reduces a rainbow party member's health points to zero that rainbow party member removes any cards they have in play, reshuffles and moves to the demon player's side of the board. This player then gets ten health points and fights with the demon player to destroy the rest of the rainbow party. Once the ten health points are reduced to zero, that player is eliminated from the game. If the demon players health points are reduced to zero, the game is over and the rainbow party is victorious. If all rainbow party members health points are reduced to zero, the demon player is victorious. If the demon player destroys all of the rainbow prism, he is victorious.

Figure 13:
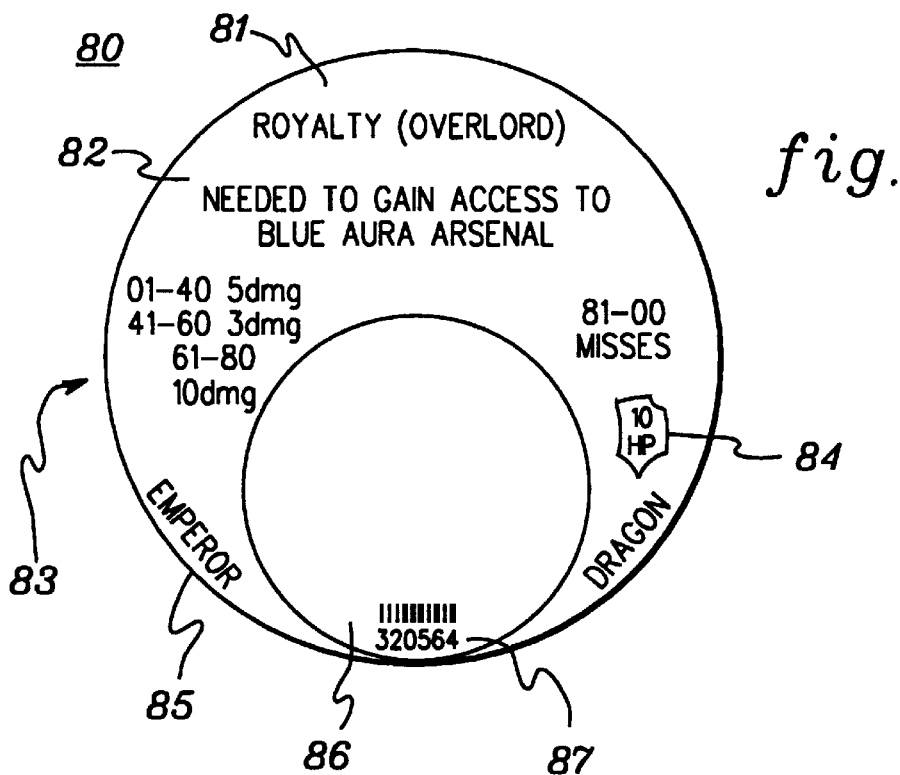
FIG. 13 depicts a typical game card pursuant to the present invention.
Figure 14:
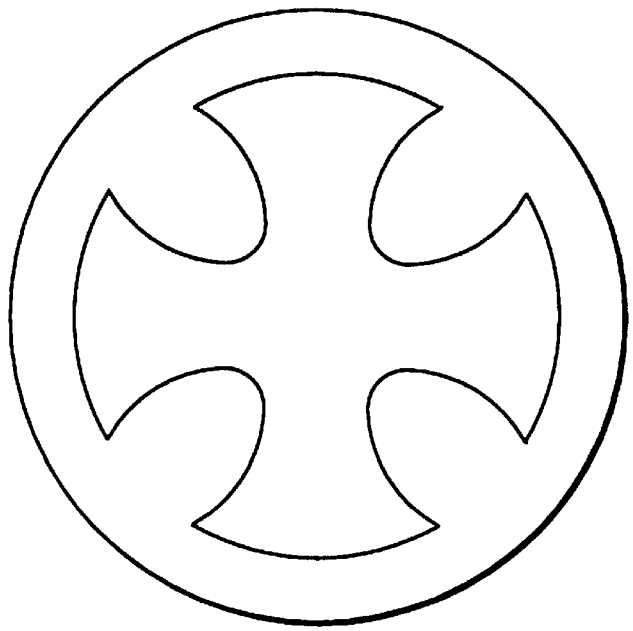
FIG. 14 depicts the back side to a typical game card pursuant to the present invention.

Referring now to FIGS. 13 and 14, a typical game card is shown. Each game board has its own individual set of game cards which are of a particular shape. The game cards shown here are for the first game board and are round. Each game card has two sides. FIG. 13 depicts a first side which includes various information about the card. FIG. 14 depicts the back side of the card which aside from color is the same for all cards in play. Referring to FIG. 13, the following information on card 80 is given. The type of card 81 is provided. In this case the card is a Royalty Overlord which will be associated with a particular color. In addition, information, 82, regarding that card is provided. In this case, the information is that the card is needed to gain access to the blue Aura Arsenal. A range 83 as to how much damage may be inflicted during an attack, e.g, 10 points, is also provided. Furthermore, the amount of health points associated with the card 84 is provided. The name of the card, in this case Emperor Dargon, is provided 85. A graphical picture or card art 86 is also depicted on the card. Finally, the card is provided with a number and perhaps an associated bar code 87. The ranges which determine whether or not a particular attack or defense was successful, are triggered by the roll of a game dice. Generally, each game board will have its own set of six, different colored, ten sided percentile game dice. The player rolling the dice can announce which die will correspond, with which digit. Once the dice have been rolled, the player refers to the ranges on the cards to determine if the roll was a hit or a miss.

Figure 15:
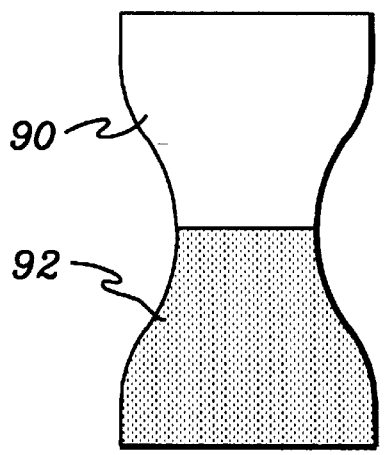
FIG. 15 depicts the front side of an alternate type of game card.

FIG. 15 depicts an alternate embodiment card used for the fifth game (Gemini's of Jescuitin). These cards are different in that they contain two sets of information. The set that will be used for a given turn depends upon what color happens to be involved. For instance, the top part 90 will contain one set of information, while the bottom part 92 will contain a second part.

An additional feature of this game is that cards can be swapped, or won and lost during game play. Furthermore, certain cards are considered more or less rare than other ones. For instance, a complete set of cards for each class game will include 708 total game cards. There will be 108 Neutral Resource cards, 264 common Aura Arsenal cards, 180 uncommon Aura Arsenal cards, 108 rare Aura Arsenal cards, and 48 ultra rare Aura Arsenal cards. The basic set will include 108 neutral resource cards and 20 of each aura (120 total) arsenal cards. These cards will be randomly packaged so each player will start with an individualized set of cards. Additional booster packs may then be purchased to supplement and enhance a player's aura arsenal, thereby increasing strategic capabilities.

Also incorporated is a unique numbering system that allows easy tracking of each and every game board, item, and individual game card ever created for the game. Each game piece ever produced has its own unique number. This numbering system allows for the scanning or manual entry of each game card into a computer network (such as the Internet) such that players can play on-line against other players. On-line play will be facilitated by a database suitable for tracking and registering all on-line players and their respective game cards. Once a card has been entered by a given player, no other player will be able to enter or use that card unless it is first removed from the database. Thus, any one card may only be utilized by one player at any given time. The system will also include a computer programmed to simulate game play. This will allow players to play each other, or play with or against the computer.

The following table describes the breakdown of how the numbering system may work.

BREAKDOWN OF THE MALREATH GAME INDIVIDUAL NUMBERING SYSTEM

| WHICH GAME | PRODUCT TYPE | AVAIL- ABILITY | AURA | CARD TYPE | SPECIFIC CODE # | INDIVIDUAL PLACEMENT IN PRODUCTION |
|---|---|---|---|---|---|---|
| 1. Cleric | 1. Card | 1. Ultra | 1. Neutral | 1. Spell | Every | 000000001 |
| 2. Thief | 2. Board | 2. Rare | 2. Blue | 2. Army | card and | # thru |
| 3. Knight | 3. Promo | 3. Uncommon | 3. Yellow | 3. Creature | support | 999999999 |
| 4. Mage | 4. Support | 4. Common | 4. Green | 4. Artifact | product | depending |
| 5. Gemini | | | 5. Red | 5. Weapon | is | on how |
| 6. Demon | | | 6. Black | 6. Armor | assigned | many are |
| | | | 7. White | 7. Item | a specific | produced |
| | | | | 8. Royalty | # when it | |
| | | | | 9. Character | is | |
| | | | | 0. Event | scheduled | |
| | | | | | for | |
| | | | | | production | |

Once a card is no longer able to be scanned or becomes illegible, it will be considered no longer playable except for private games. This also allows for better tracking of the potentially lucrative single card market.

Certain standard cards will be available with each game sold. Additional cards may be available through special releases, etc. Thus, players can collect rare cards that possess individual and unique powers and build up their own decks for play in any given game. Cards will generally fall into the categories of common, uncommon, rare or ultra rare. Typically, no ultra rare cards are distributed with the basic game set.

The foregoing description of the preferred embodiments of the invention have been presented for purposes of illustration and description. It is not intended to be exhausted or to limit the invention to the precise form disclosed, and obviously many modifications and variations are possible in like of the above teachings. Such modifications and variations that maybe apparent to a person skilled in the art are intended to be included within the scope of this invention as defined by the accompanying claims.

We claim:

1. A game for play by a plurality of players comprising:
   a random number generating device for generating whole numbers; and
   a plurality of game cards wherein each game card comprises a plurality numerical ranges and associated outcome values, each range comprising a subset of possible numbers from said random number generating device.

2. The game of claim 1 further comprising:
   a plurality of class game boards, each comprising means for determining a class winner; and
   a final game board, comprising means for a battle between said class winners and a final opponent.

3. The game of claim 2 wherein said class game boards comprise a first side and a second side, both sides comprising means for play.

4. The game of claim 1 wherein each of said game cards comprise a unique card identification number, said card identification number providing series information regarding a type and availability of said card.

5. The game of claim 4 wherein a player's game cards' identification numbers can be entered on-line such that a plurality of players can play each other via a computer network.

6. The game of claim 2 wherein the shape of said game cards differs depending upon the game board being used.

7. The game of claim 1 wherein said plurality of game cards comprise a first type and a second type of cards.

8. The game of claim 7 wherein said first type of cards comprise six subgroups, each of said six subgroups being represented by a different color.

9. The game of claim 8 wherein said second type of cards comprises six ruler cards, each of said ruler cards comprising means for controlling one of said subgroups.

10. The game of claim 1 wherein said random number generator comprises at least one die.

11. The game of claim 10 wherein said die generates an outcome that falls within one of said numeric ranges on each game card.

12. The game of claim 3 wherein said first side of each of said class game boards includes means to eliminate all but two players and the second side includes means to determine a class winner from the two players.

13. A method for playing a role playing game comprising the steps of:
   providing a first class game board with a first side and a second side;
   placing game cards in predetermined positions on the first side of said first class game board;
   distributing a predetermined number of cards to each player;
   providing each player with a predetermined number of health points;
   determining an order of play;
   in turn, allowing each player an opportunity to utilize cards and a dice to attack any of the other players;
   allowing an attacked player to utilize his or her game cards to defend against said attack;
   providing a means for determining an effect of said attack and reducing an appropriate number of health points from each player involved;
   eliminating a player when the player no longer has any health points;
   halting play on said first side of said first class game board when only two players remain;
   resuming play on said second side of said first game board between the two remaining players of said first class game board until a class winner is determined;
   repeating the above steps a predetermined number of times utilizing different class game boards until a predetermined number of class winners are determined; and
   providing a final game board wherein said class winners unite and play against a final opponent.

14. The method of claim 13 wherein different rules apply to the second side of each of said different class game boards.

* * * * *

UNITED STATES PATENT AND TRADEMARK OFFICE
CERTIFICATE OF CORRECTION

PATENT NO.  : 5,954,332

DATED       : Sep. 21, 1999

INVENTOR(S) : Mero et al.

It is certified that error appears in the above-identified patent and that said Letters Patent is hereby corrected as shown below:

Column 1, line 5, delete "5,810,661" and insert — 5,810,666 —.